Patented July 17, 1934

1,967,043

UNITED STATES PATENT OFFICE 1,967,043

PRODUCTION OF ADHESIVES AND SURFACING MATERIALS

Chester Snyder, Yonkers, N. Y., assignor to Angola Chemical Corporation, New York, N. Y., a corporation of New York No Drawing. Application September 17, 1932, Serial No. 633,691

11 Claims. (Cl. 134—11)

My invention relates to the production of a tenacious, elastic material which shall be practically vapor proof, and which may be used both as an adhesive and for surfacing purposes.

Objects of my invention are to produce such a material which will be strongly adherent, elastic in degree, and highly flexible, practically impervious to vapor and gases and strongly resistant to acids and alkalis; to produce such a substance which will not be readily inflammable; which may be readily sprayed, spread or rolled in the process of using it for a surface coating; and which will strongly resist deterioration; to produce such a material from substances which are substantially innocuous so far as any poisonous or corrosive characteristics are concerned; to produce with such a material, combined as a coating with paper or textile material, a flexible article having the impervious and resistant qualities above mentioned; and to secure these results in a practical and economical way which will make them commercially valuable; and also to secure the other advantages hereinafter described.

In carrying my invention into effect I use as a base a gum of vegetable origin, and an oil of vegetable origin, combined with heat, and then, if desired, thinned with a suitable solvent. For instance, to 2 parts, by weight, of gum derived from the jelutong tree, or a gum having substantially the same qualities and characteristics, I add 1 part, by volume, or castor oil, which should be practically moisture free. I then subject the mass to a temperature of from 300° to 400° Fahrenheit, which will evaporate the turpines, essential oils and similar elements; harden the mass and increase its insolubility; make it less susceptible to atmospheric changes; change the character of the mass so that it is no longer completely soluble in alcohol at normal temperatures; and will leave a homogeneous residue which is plastic, somewhat elastic, tenacious and adhesive, and which is sufficiently soft at a temperature of about 300° to 400° to be sprayed or otherwise applied to a surface, and which will readily and strongly adhere to the surface, whether it be metal, wood, paper or other material. It may also be spread or rolled upon a surface at a somewhat lower temperature, for instance, 350° Fahrenheit, so as to form a thin, uniform coating upon the article to which it is applied.

It is convenient, however, to thin the material by the addition of a quantity of butyl alcohol, for instance, 3 parts, by volume, when the material is at a temperature of about 180° to 200° Fahrenheit, under which condition the alcohol will unite with the plastic material and dissolve it into a solution which, when cold, may be spread or applied by the use of a spreader or roller or may be applied by spraying.

The proportions which I have suggested above may be varied to suit the requirements of material for particular purposes. For instance, by increasing or diminishing the proportion of castor oil the adhesiveness of the mass may be increased or diminished as may be most desirable for the particular ends in view. Also by increasing or diminishing the proportion of alcohol used the liquidity of the compound may be varied so as to best suit the requirements of its use under modified conditions.

In the absence of impurities the mass and the surfaces produced with it or with the solution will be transparent, practically impervious to water vapor, strongly resistant to gases and acids and in a somewhat less degree to alkalis; and will not be soluble in petroleum solvents.

In use as an adhesive my improved material has the advantage of remaining sufficiently elastic so as to allow for the difference in expansion of materials joined by it under changes of temperature, humidity and ordinary stresses, so that the joint formed with it will not break away or loosen. The material, also, has quite a high point of inflammability; as it will stand temperatures up to approximately 500° to 800° Fahrenheit, without vaporizing or burning. This renders it peculiarly adaptable for attaching fire proof, or fire resistant coverings to backgrounds. It also causes the surface formed by it to afford a much better protection against fire combustion than ordinary japans, paints, enamels and the like.

When my improved material is used for a coating for paper the product will be well adapted for such uses as the formation of moisture proof and vapor proof containers for foods, both moist and dry; and as the coating is practically insoluble by the juices of food fruits and vegetables, lactic acid, meat acids and other gases or acids emanating from foods, the coated paper is particularly well adapted for the exclusion of or inclusion of moisture from or in foods and also for protection of foods against contamination. These suggestions for use are simply typical, and in no sense exclusive; and it is obvious that there is a wide range of uses for flexible, impervious wrappings and the like.

I wish it to be distinctly understood that the practice of my invention extends to the use of equivalents such as other gums or synthetic preparations as may possess substantially the same qualities and characteristics as the gum derived from the jelutong tree, for instance, a gum known by the trade name of pontianank (or pontianic) gum may be used, although I have not found it to be quite as efficient as the jelutong gum. Other oils having characteristics similar to castor oil might be employed; and acids such as ricinoleic, oleic and palmitic acid, linoleic acid, linoleneic acid and other similar fatty acids, might be substituted for the castor oil; although I have not found any of them to be as satisfactory in practice.

Furthermore, wood creosote, coal tar creosote and creosote oil, creosols and creosolic acid and the phenols may be used instead of castor oil, where the product will not be employed in connection with foods, it being understood that the quantities of such substitutes used with the gum will be varied in proportion to their concentrated values.

It is possible to combine the gum oil and alcohol without heat; but the result will not be as satisfactory, because ingredients such as the turpines and other substances which would be driven off by the heat as suggested above will remain present and will produce objectionable characteristics in the mass, such as undue tackiness for a long period and brittleness after the material has thoroughly dried; and they would also preclude the use of the material in connection with foods, except after a long period of drying. Other alcohols might be used instead of the butyl alcohol. But I have found the latter most satisfactory because of its high boiling point which simplifies its use in producng my material.

It is possible to add rubber to the compound during the combination of the gum and oil with heat and before the addition of alcohol; but it would be desirable to use xylol with the alcohol in order to bring the mass into a suitable solution. But this addition of rubber would result in a diminution of the adhesiveness and impermeability of the compound and would interfere with the use of the material in connection with foods.

Having thus described my invention what I claim and desire to secure by Letters Patent of United States is:—

1. The method of preparing a material of the class described, which consists in combining jelutong gum with castor oil in the presence of heat into a homogeneous, plastic mass.

2. The method of preparing a material of the class described, which consists in combining jelutong gum with castor oil, in the presence of heat sufficient to drive off the turpine and other volatile elements, into a homogeneous, plastic mass.

3. The method of preparing a material of the class described, which consists in dissolving jelutong gum and castor oil in alcohol.

4. The method of preparing a material of the class described which consists in combining jelutong gum with castor oil in the presence of heat and dissolving the residuum in alcohol.

5. The method of preparaing a material of the class described which consists in combining jelutong gum with castor oil in the presence of heat, allowing the residuum to cool below the boiling point of alcohol and then dissolving it in alcohol.

6. The method of preparing a material of the class described which consists in combining jelutong gum with castor oil in the presence of heat sufficient to drive off the turpine and other volatile elements, allowing the residuum to cool below the boiling point of alcohol and then dissolving it in alcohol.

7. A material of the class described consisting of jelutong gum and castor oil and alcohol combined in a plastic form.

8. A material of the class described consisting of jelutong gum and castor oil substantially free from volatile elements.

9. A new article of manufacture consisting of a sheet of paper or the like, having a surface impervious to moisture, composed of jelutong gum and castor oil.

10. A new article of manufacture consisting of a sheet of paper or the like, having a surface impervious to moisture, composed of jelutong gum and castor oil, substantially free from volatile elements.

11. A new article of manufacture consisting of a sheet of paper or the like, having a surface impervious to moisture, composed of jelutong gum, castor oil and alcohol.

CHESTER SNYDER.